April 24, 1945.    E. B. HUDSON ET AL    2,374,599
CONTOUR ROLLING MEANS
Filed June 10, 1943    3 Sheets-Sheet 1
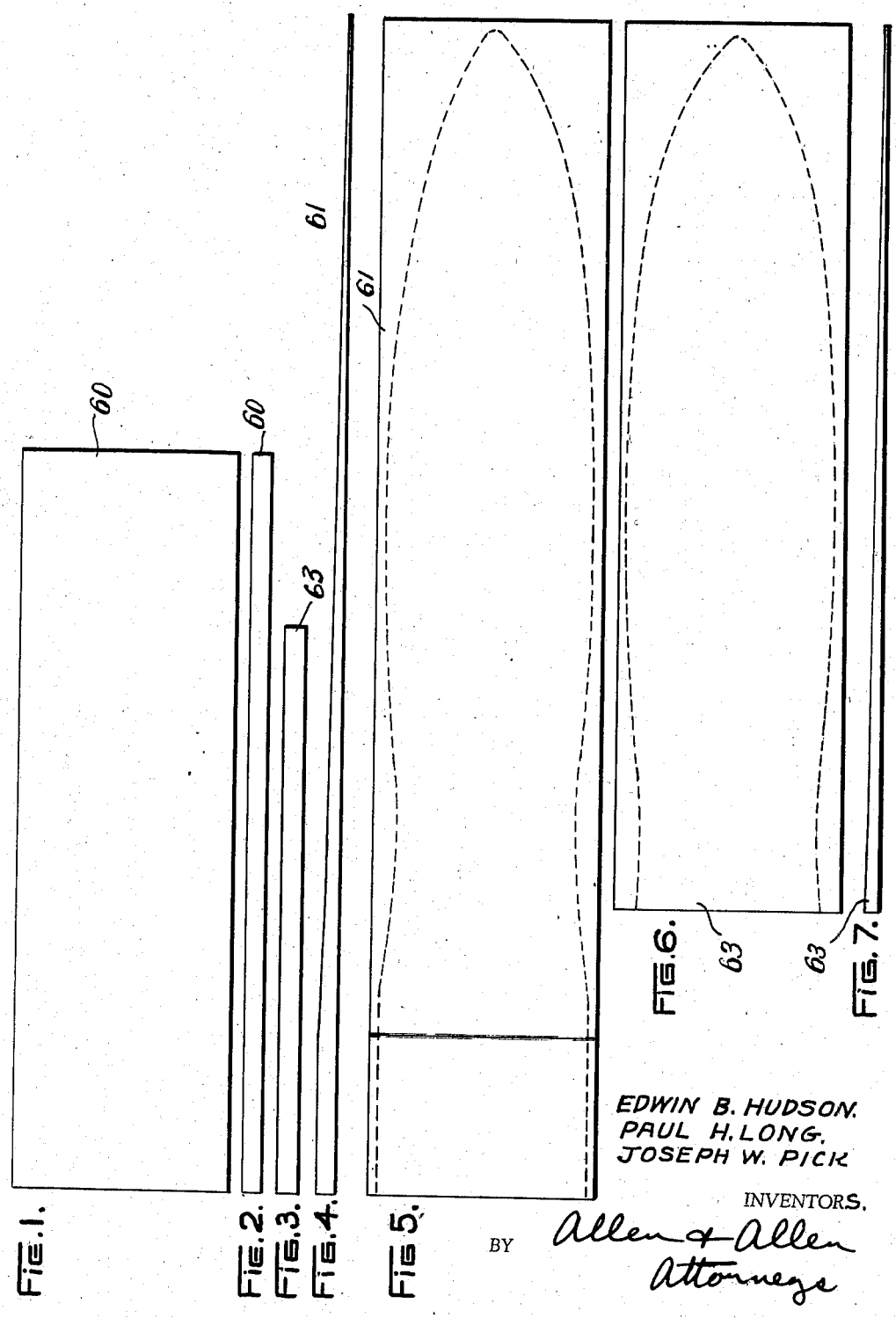
EDWIN B. HUDSON.
PAUL H. LONG.
JOSEPH W. PICK
INVENTORS.
BY Allen & Allen
Attorneys

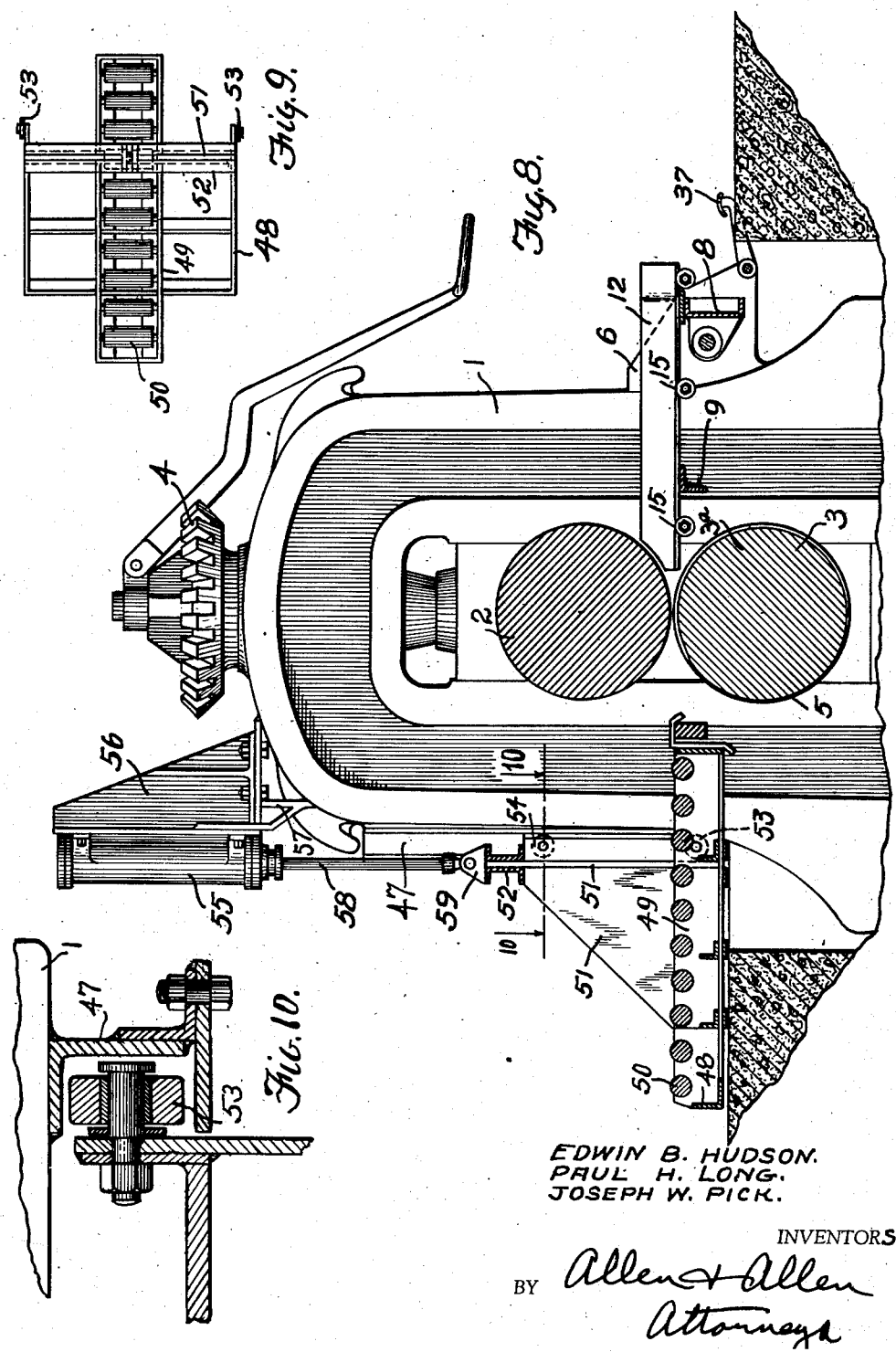

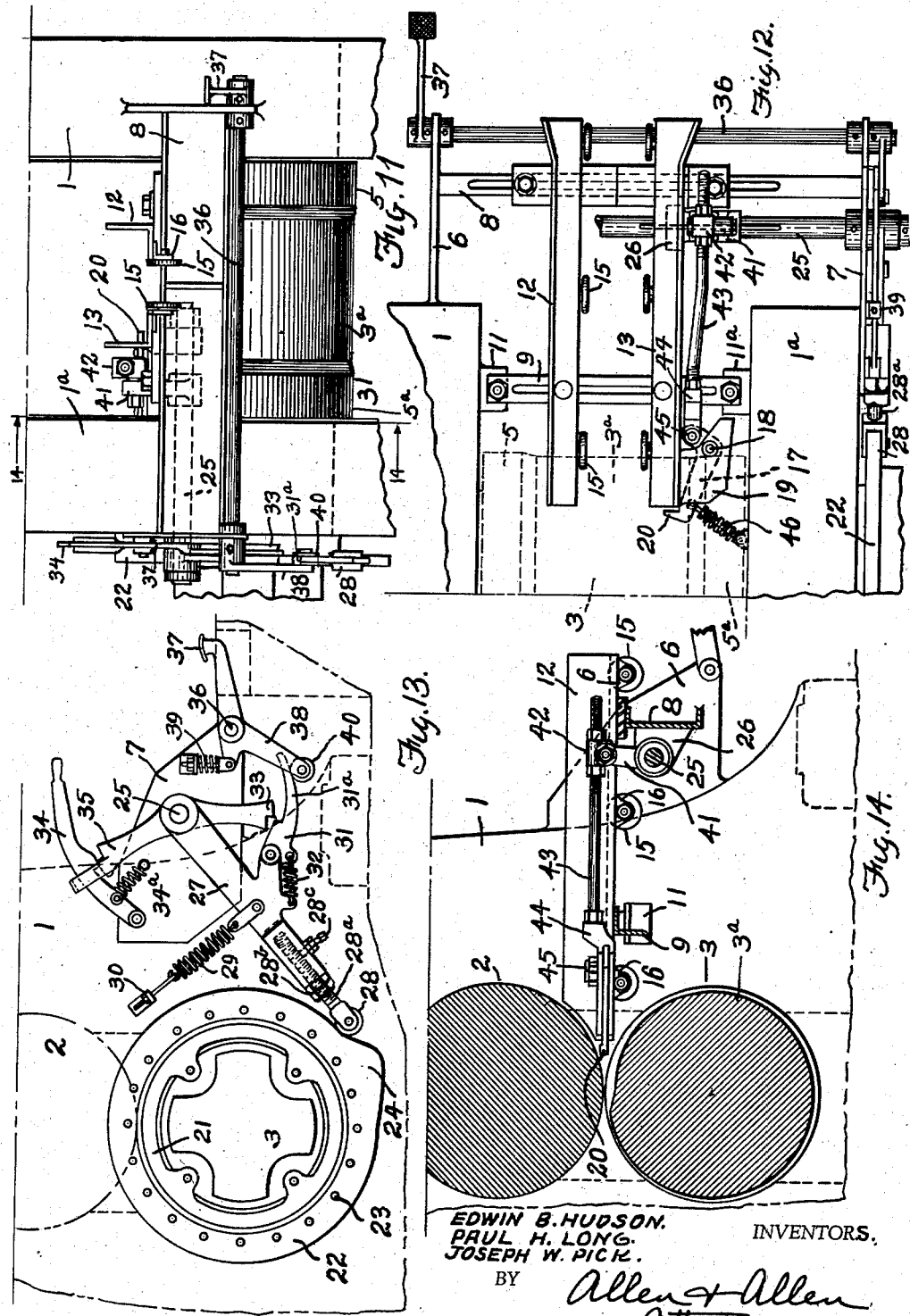

Patented Apr. 24, 1945

2,374,599

UNITED STATES PATENT OFFICE 2,374,599

CONTOUR ROLLING MEANS

Edwin B. Hudson, Paul H. Long, and Joseph W. Pick, Middletown, Ohio, assignors to The American Rolling Mill Company, Middletown, Ohio, a corporation of Ohio Application June 10, 1943, Serial No. 490,286

7 Claims. (Cl. 80—26)

Our invention relates to the problems connected with the rolling of metal to shapes of other than constant gauge or thickness. In order that the nature of the invention and its field of utility may be more readily understood, we shall describe it in a particular embodiment in the manufacture of shapes for a particular purpose, it being understood that these are illustrative and not limiting.

In the manufacture of hollow airplane propellers of steel or similar hard metals two members each of which is of varying thickness or gauge throughout its length, and each of which has been formed up and trimmed to a particular shape, are welded or otherwise fastened together to make each hollow blade. In the customary process of manufacture a slab or plate of suitable metal is first produced. It will of course be both wider and longer than the finished blade, and its thickness will be at least the maximum thickness required for the part which is to be made from it, with due allowance for the removal of metal during machining and finishing. By way of example, such a plate may be ½ inch or more in thickness. It is clamped on the bed of a milling machine or shaper and then is machined to the required cross sectional contour. In the machined plate one end will remain thick and proceeding toward the other ends this thickness may be maintained for a space of several inches to provide a heavy portion which may later be curved around to form the hub of the blade. Then there may be a sharp offset of .030" to .040" per inch for a short distance, from there on to the other end of the plate there will be a gradual though not necessarily uniform taper to a thickness of, say, .130 inch. Although the plate must be machined with great accuracy, the precise dimensions are no more than illustrative as respects our invention.

After the machining operation, the contoured plate will be forged with the upturning and rounding of its edges; it will be trimmed to shape, and will be prepared for juncture with another contoured plate which will differ as to length and shape (in particular omitting the hub portion) but which will have otherwise the same tapering contour, and must be machined in the same manner.

The entire operation of manufacturing and balancing a hollow propeller blade is laborious, complicated and lengthy; and it need not be detailed here. But it will be evident that the initial machining of the plates is economically a very important step. It is slow, requires a large capital outlay in machine tools, involves a high labor cost and is wasteful of material since about half of the metal of the initial plate is frequently machined away.

A primary object of our invention will be made clear when we state that in the exemplary field we produce plates by rolling but having as rolled the required tapering contour so accurately that only a light machining, if any, is required.

It is an object of our invention to produce rolled plates having accurately a non-uniform gauge or thickness or contour, and in which the contour variations are accurately placed as respects the length of the plate.

It is an object of our invention to provide an apparatus for rolling such contoured shapes which is not complicated but on the contrary is rapid and economical, and quite comparable in cost to ordinary rolling operations.

It is an object of our invention to provide an apparatus for rolling contoured shapes with ordinary rolling equipment which need be modified only through the addition of certain relatively simple and therefore relatively inexpensive mechanical means.

It is an object of our invention to provide an apparatus for rolling of the type hereinabove mentioned in an ordinary rolling mill with the ordinary drive for that mill. As to such mills the usual two-high mill is adequate and will be employed by us in connection with the description of an exemplary form of our invention. It will be understood that the invention itself is not so limited but may be employed on other types of mills. Of course, one of the working rolls must be sufficiently large so that its circumference will accommodate the configuration required to produce the desired contour in the finished piece.

These and other objects of our invention which will be set forth hereinafter or will be apparent to one skilled in the art upon reading this specification we accomplish in that construction and arrangement of parts of which we shall describe the aforesaid exemplary embodiment. Reference is made to the drawings forming a part hereof and in which:

Figure 1 is a plan view of an exemplary starting piece for one of the members of a hollow propeller blade.

Figure 2 is a side elevation thereof.

Figure 3 is a side elevation of a similar but shorter piece required in the formation of the other member of a hollow propeller blade.

Figure 4 is a side elevation of the finished rolled product made from the blank or starting piece of Figures 1 and 2.

Figure 5 is a plan view of the same finished product on which we show in dotted lines the approximate shape to which it will be trimmed in the manufacture of the blade.

Figure 6 is a plan view of a finished product made from the blank or starting piece of Figure 3 with a trimming outline similarly indicated.

Figure 7 is a side elevation of the same finished piece showing the rolled contour.

Figure 8 is a vertical section taken along the center line of the mill.

Figure 9 is a partial plan view of a rear elevator.

Figure 10 is a sectional view taken along the line 10—10 of Figure 8 and showing a portion of the elevator and its guide.

Figure 11 is a partial front elevation of the mill showing in particular a guide and release mechanism.

Figure 12 is a partial plan view of the same devices.

Figure 13 is a partial end view of the mill showing cam means on a working roll and portions of the release mechanism.

Figure 14 is a sectional view taken along the line 14—14 of Figure 11 and presenting a side view of a portion of the release mechanism.

Briefly in the practice of our invention we provide a mill of which one of the housings is shown at 1 in Figure 8. The particular mill has a pair of working rolls 2 and 3 and in the embodiment shown is a two-high mill although, as indicated, other types of mill may be employed. The roll mechanisms are mounted in suitable bearings in the slots of the mill housing; and the mill is provided with the ordinary screwdown, part of which is indicated at 4 in Figure 8.

The lower roll 3 of the exemplary embodiment is the driven roll of the pair, and is driven in the usual fashion by the usual means. The roll 3 is a contoured roll, turned to present a circumferential contour suitable for rolling the particular desired contour of the piece. The central portion only of the roll 3 is contoured as indicated at 3a in Figure 12. The end or outlying portions of the roll as at 5 and 5a are left cylindrical so that tight rolling may be accomplished in the finishing passes. It follows that of necessity the piece being rolled will be narrower than the length of the working rolls. In the particular embodiment shown the upper roll 2 is both undriven and uncontoured. It is not necessary that it be driven, but it may be driven if desired. If it is both driven and contoured, then it will be necessary that it have the same diameter as the portions 5 and 5a of the lower roll and that it be driven in exact synchronism with it. This may be accomplished by gearing. Of course, the specific arrangement shown could be reversed and the upper roll could be the contoured driven roll while the lower roll could be uncontoured and undriven. This would make no difference so far as the functioning of our invention is concerned.

The contouring of the contoured working roll is preferably accomplished on a roll turning lathe by providing a suitably shaped cam to control the working movement of the tool or tools. It may be noted at this point that the contour cut on the working roll will not be merely a reverse counterpart of the contour desired in the finished rolled piece. The spring of the rolls during rolling must be taken into account. This spring will differ for rolls of different diameters and of course will differ for different work pieces at different temperatures. For given work pieces of the same character and at the same temperatures, and assuming constant temperature of the rolls, a contour can however be calculated, or arrived at by cut and try methods, or both.

With a contoured working roll or contoured pair, an immediate problem involves the feeding of the pieces to the work rolls in precise synchronism. If this is not done, the contour will not be reproduced at the proper position on the work piece, as will be evident. We overcome this difficulty by a combination of features which includes the provision of a guide for the piece, a stop to hold the piece in the guide and a release mechanism which will move the stop out of the way at such a time, synchronized with the rotation of the contoured roll, as will insure the entry of the piece at the proper point on the circumference of that roll. We have found that if the guide extends up close to the bite of the rolls, accurate feeding may be accomplished by hand and we will describe a mechanism and operation of this sort. It will be evident to the skilled worker in the art, however, that should mechanical feed be desired, powered means for urging the piece forward against the stop and for moving it into the bite of the rolls when the stop is removed may be added to the combination herein described.

Moreover, where the piece is not to be contoured at one end, and where this is made the entering end, we find that synchronism may be obtained in rolling and rerolling the piece any number of times as the rolling schedule may require.

Referring to Figure 12, we attach brackets 6 and 7 to the mill housings 1 and 1a. From one bracket to the other we run a supporting bar 8 while another supporting bar 9 passes between the housings and is bolted to brackets 11 and 11a thereon. On the bars 8 and 9 we fasten a guide which in the exemplary embodiment shown comprises a pair of angle irons 12 and 13 so spaced that their vertical legs will receive between them and guide a work piece of the required width. In the supporting bars 8 and 9 we have shown slotlike holes. These slots permit the setting of the side guides for different plate widths. In order to facilitate the passage of the work piece over the horizontal legs of these angle irons, we prefer to equip them with anti-friction rollers 15 which may be mounted on ears 16 welded or otherwise attached to the angle irons (see Figure 14). There may be as many of these anti-friction rollers as are deemed necessary for the purpose. The entering ends of the angle irons may be flared as shown in Figure 12.

A stop device, in our exemplary embodiment, takes the form of a bell crank 17 pivoted as at 18 to a bracket 19 fastened to one of the angle irons. The stop has a tooth or abutment 20 which extends beyond the end of the angle iron and into the path of a work piece resting on the anti-friction rollers 15. The fact that the guide and the stop extends well up into the bite of the rolls is illustrated in Figure 14.

The stop will be moved to release the work piece by mechanism which is actuated accurately in accordance with the rotation of the contoured roll. In Figure 13 we have shown, attached to the end of the contoured roll 3 a circular flange or collar 21. A cam 22 is attached to this collar by a series of bolts 23 which will permit a variation of the orientation of the cam for the purpose hereinafter to be described. The cam may be circular excepting for a protuberance as at 24. It will be understood that for special purposes other cam shapes may be adopted.

A shaft 25 is journaled in the bracket 7 and also preferably in a bearing 26 fastened to the cross bar 8. On this shaft we rotatably pivot an arm 27 at one end, bearing at its other end a cam follower 28, which we prefer to mount on an adjusting screw 28 having lock nuts 28b and further prevented from turning by a set screw 28c having a point resting in a groove of the screw. This enables us to compensate for minor bite variations. A tension spring 29 is fastened between the arm and a bracket 30 on the mill housing, and operates to keep the cam follower against the cam (Figure 13). A toothed latch 31 is pivoted to the arm 27 and is normally controlled by a tension spring 32 extending between it and the arm in such a way as not to engage an arm 33 which is fastened non-rotatably to the shaft 25. A manual latch mechanism 34 pivoted to the mill housing and controlled by a tension spring 34a is provided. It engages a notch on an arm 35 which is non-rotatable with respect to the arm 27. If the arm 27 be rotated by the cam in a counterclockwise direction the latch 34 will engage the arm 35 and hold it from clockwise movement. This effectively prevents movement of the arm 27 in response to the cam, and renders the release mechanism temporarily inoperative.

A shaft 36 passes between and is journaled in the brackets 6 and 7. At one end this shaft has non-rotatably affixed to it a foot treadle 37. At its other end it carries an arm 38 controlled by a compression spring 39. The arm 38 is also non-rotatably affixed to the shaft 36, while the spring 39 tends to urge it in a counterclockwise direction. The arm 38 bears a roller 40 which contacts an extended finger 31a on the latch 31. It will be evident that if the shaft 36 by means of the foot treadle 37 is rotated slightly in a clockwise direction, the latch 31 will be raised sufficiently to engage the notch in the double arm 33, thus effectively connecting the cam arm 27 to the shaft 25. When the arm 27 is depressed by the protuberance 24 of the cam 22 the shaft 25 will be rotated slightly in a counterclockwise direction, but only if the latch 34 has first been released.

To the shaft 25 we affix an arm 41 which in turn is pivoted to a collar 42 on a link rod 43. It is convenient to thread the end of this rod and determine the position of the collar 42 by a pair of nuts as shown so that adjustment may be had. At the other end of the rod 43 we provide a bifurcated member 44 which is pivoted as at 45 to an arm of the bell crank stop 17. It will be evident from this construction that if the shaft 25 be rocked in a counterclockwise direction, the stop 17 will be moved in such a way that its tooth 20 is moved out of the path of a work piece in the guide. Spring means are provided to urge the stop to blocking position. These means may comprise a compression spring 46 acting directly on the stop or suitable spring means may be connected with the link 43 or any of the appurtenances of shaft 25.

The operation of manually lifting the latch bar 34 set up the automatic release mechanim for operation. But the arm 27 will not operate the release unless and until the foot treadle 37 is depressed. This gives the mill operator time to position the work piece in the guide and bring it against the tooth 20 on the stop 17 and to rearrange the perches of his tongs upon it if he should feel that necessary. Another mill operator will usually release the manual latch 34 when he has determined that conditions are proper for rolling; but the stop will not release the piece until the mill feeder steps upon the treadle 37. When he does so, the stop will automatically release the piece at the proper point in the rotation of the work roll 3 and the forward pressure exerted on the piece by the mill feeder will then move the piece into the bite of the rolls at the proper instant.

Since the rolling cycle calls for a plurality of passes, and since accuracy depends largely on the temperature of the piece so that it is advisable that the piece be returned promptly to the entering side of the mill and without being bent over a deflecting bar or the like, we prefer to provide the exit side of the mill with an elevator. This may be of simple form. Channel shaped guides 47 are fastened to each of the mill housings (Figures 8 and 10). The elevator proper comprises a frame work floor 48 on which may be fastened a narrower frame 49 of anti-friction rollers 50. To the frame work floor we attach side members 51 which extend upwardly and which are connected at their upper ends by a cross piece 52 acting as a suspension. The lower and upper rolls 53 and 54 are fastened respectively to the frame work floor 48 and the uprights 51, and these rolls move in the guides 47. An air cylinder or the like 55 is fastened to a suitable bracket 56 on a cross piece 57 connecting the mill housings. The piston rod 58 of the cylinder may be connected to an ear 59 on the suspension 52. The cylinder is so connected to a source of air or other fluid under pressure that upon actuation of a valve it will cause the elevator to rise to such a position that a work piece on it may be returned over the top of the upper work roll 2. The source of pressure fluid and the valve are not shown; but the valve may be and preferably is a foot-operated valve located on the exit side of the mill in a position of convenient access to an operator who acts as a catcher and with the aid of the elevator rapidly returns the work piece to the feeder.

An exemplary work piece is illustrated at 60 in Figures 1 and 2. It will be a plate of metal of suitable composition and suitably treated for hardness and the like. Needless to say, it will have the correct dimensions for rolling as hereinafter described and for producing the desired work piece. The mill is located adjacent a furnace in which the individual work pieces 60 may be heated under such conditions that their delivery temperature may be accurately controlled. A portable conveyor, not shown, may be employed to assist the delivery of a work piece from the furnace to the mill. Such a work piece is grasped by the feeder with his tongs and is placed in the feeding guide and brought against the stop as hereinabove explained. If conditions are proper for rolling, an operator will have released the latch 34. The mill feeder adjusts the position of the pieces in the feeding guide and against the tooth 20 of the stop. When he is ready, he steps upon the foot treadle 37. The cam 22 then energizes the arm 27 at the present instant, and through it moves the stop 17 out of the way. The mill feeder is exerting pressure upon the piece in the guide, and as soon as the tooth 20 releases the piece this pressure urges it forward and into the bite of the rolls. As the piece passes through the bite of the rolls it comes out upon the rollers 50 of the elevator and as soon as it is free of the rolls the elevator is driven upwardly and the catcher returns the piece to the feeder over the top work roll. In the meantime, the feeder or another operator will have shifted the mill screwdown. The operations are then repeated in the manner already described for as many mill passes as are deemed desirable in this part of the rolling.

It is usual with us to give the work piece three passes with intermediate adjustment of the work rolls. The piece is then returned to the furnace for reheating, after which it is given two more passes through the same rolls and under the same general conditionss excepting that the screwdown is turned down tight so that these finishing passes at least are made under conditions known as "tight rolling." The mill rolls meanwhile are maintained cold by means of a shower of water so that the operation is essentially one of hot rolling with temperature controlled mill rolls for the sake of accuracy. Accuracy is also obtained, as will be evident, from a careful control of the temperature of the work piece at the start of the two rolling stages.

The work piece is returned by the catcher to the feeder in the same orientation in which it passed through the mill. The work piece 60 may be rolled to such a shape as that shown at 61 in Figures 4 and 5. The orientation of the piece during rolling is such that that end which is not to be reduced or is to be reduced least passes first into the bit of the rolls. Under these circumstances elongation of the piece does not affect synchronism.

As has already been explained hollow propeller blades are made from two pieces of metal both contoured but differing from each other in certain aspects, one of which may be the omission on one of the pieces of that thick portion on the other which will be formed up into the hub. Hence the exemplary operation involves also the formation from a work piece 62 in Figure 3 of a second finished product 63 illustrated in Figures 6 and 7. This furnishes a primary reason why we form our cam 22 separately from the collar 21 affixed to the work roll 3. We can thus shift and adjust the position of the cam 22 with respect to the work rolls, and after having rolled a series of the pieces 60 to the shape 61, we can then shift the cam and roll a series of the pieces 62 to the shape 63.

In an exemplary operation a work piece 60, initially approximately 36 inches long and approximately .550 inches in thickness will be rolled and elongated to around 86 inches in length and to the approximate contour illustrated in Figure 4 where an initial length of the piece will be unreduced and thereafter the piece will taper from .550 inch to .130 inch in a controlled manner. In the inspection of the finished pieces it is usual to measure their gauge at intervals of 3 inches or less throughout their length and we have succeeded commercially in regularly turning out pieces which do not differ at any point on their surfaces from the desired gauges at such points by more than .002 or .003 of an inch. Such pieces obviously require little or no machining. In most instances a light grinding is all that is required to make the gauges accurate within the specified tolerances. This is to be contrasted with former machining operations wherein it was necessary to cut away approximately half of the metal from a long plate of uniform thickness.

Modifications may be made in our invention without departing from the spirit of it. Having thus described our invention in an exemplary embodiment what we claim as new and desire to secure by Letters Patent is:

1. A mill having a pair of work rolls, one of which is non-cylindrically contoured and driven, a guide on the entering side of said mill having a portion approaching the bite of said rolls, movable stop means interposed in the path of movement of a work piece in said guide substantially at the point where said guide approaches said bite, and means for moving said stop means automatically, said means comprising a cam mounted to rotate with said non-cylindrical work roll, a cam follower and an operating connection between said cam follower and said stop whereby said cam acts to move said stop when said non-cylindrical work roll attains a predetermined rotative position, said contoured work roll having a relieved portion and a less relieved portion characterized by progressively increasing radii, the said cam being so adjusted that the release of a work piece occurs substantially when said relieved portion is located in the bite of the rolls, said non-cylindrical work roll having cylindrical portions located at the ends of the non-cylindrical portion whereby tight rolling may be accomplished, and said connection between said cam follower and said stop including a latch mechanism whereby said connection is ineffective until said latch is actuated, and foot treadle means for actuating said latch, and additional latch means for holding said cam follower in a position in which it will not be actuated by said cam.

2. In a rolling mill a pair of work rolls, one of which has a non-cylindrical portion and is driven, a guide for introducing a work piece into the bite of said rolls, movable stop means having a position in which a portion lies in the path of a work piece in said guide, a cam affixed to the work roll having a non-cylindrical portion, an arm rotatable on a shaft, said arm bearing a cam follower, spring means to cause said follower to follow said cam, releasable means for connecting said arm fixedly to said shaft, said releasable means comprising a latch on said arm, and a second arm on said shaft coacting with said latch, means to urge said latch to open position, foot treadle means for moving said latch to closed position, and a connection between said shaft and said stop for moving said stop.

3. In a rolling mill a pair of work rolls, one of which has a non-cylindrical portion and is driven, a guide for introducing a work piece into the bite of said rolls, movable stop means having a position in which a portion lies in the path of a work piece in said guide, a cam affixed to the work roll having a non-cylindrical portion, an arm rotatable on a shaft, said arm bearing a cam follower, spring means to cause said follower to follow said cam, releasable means for connecting said arm fixedly to said shaft, said releasable means comprising a latch on said arm, and a second arm on said shaft coacting with said latch, means to urge said latch to open position, foot treadle means for moving said latch to closed position, and a connection between said shaft and said stop for moving said stop, and means for holding said first mentioned arm in such a position as not to be actuated by said cam, said last mentioned means comprising a second latch member and a third arm non-rotatable with respect to said first arm, said last mentioned latch having a manual release.

4. In a rolling mill a pair of work rolls, one of which has a non-cylindrical portion and is driven, a guide for introducing a work piece into the bite of said rolls, movable stop means having a position in which a portion lies in the path of a work piece in said guide, a cam affixed to the work roll having a non-cylindrical portion, an arm rotatable on a shaft, said arm bearing a cam follower, spring means to cause said follower to follow said cam, releasable means for connecting said arm fixedly to said shaft, said releasable means comprising a latch on said arm, and a second arm on said shaft coacting with said latch, means to urge said latch to open position, foot treadle means for moving said latch to closed position, and a connection between said shaft and said stop for moving said stop, and means for holding said first mentioned arm in such a position as not to be actuated by said cam, said last mentioned means comprising a second latch member and a third arm non-rotatable with respect to said first arm, said last mentioned latch having a manual release, and said cam being adjustable as to its orientation with respect to said roll.

5. In a rolling mill a pair of work rolls, one of which has a non-cylindrical portion and is driven, a guide for introducing a work piece into the bite of said rolls, movable stop means having a position in which a portion lies in the path of a work piece in said guide, a cam affixed to the work roll having a non-cylindrical portion, an arm rotatable on a shaft, said arm bearing a cam follower, spring means to cause said follower to follow said cam, releasable means for connecting said arm fixedly to said shaft, said releasable means comprising a latch on said arm, and a second arm on said shaft coacting with said latch, means to urge said latch to open position, foot treadle means for moving said latch to closed position, and a connection between said shaft and said stop for moving said stop, and means for holding said first mentioned arm in such a position as not to be actuated by said cam, said last mentioned means comprising a second latch member and a third arm non-rotatable with respect to said first arm, said last mentioned latch having a manual release, and said cam being adjustable as to its orientation with respect to said roll, said mill on the exit side having also an elevator movable from a position in which it can receive a work piece from the bite of said rolls to a position in which it can deliver said work piece to the entering side of said mill over said work rolls.

6. In a rolling mill a pair of work rolls, one at least of which is non-cylindrical in conformation, the said non-cylindrical roll being driven, a guide extending toward the bite of the rolls, a movable stop for a work piece mounted so as to have a portion extending into the path of a work piece in said guide and closely adjacent the bite of said rolls, an adjustable cam mounted to rotate with said non-cylindrical work roll, a cam follower, and means connecting said cam follower with said stop in such a way as to remove said stop from the path of said work piece at a particular desired point in the rotation of said non-cylindrical work roll, latch means for rendering said cam follower ineffective in moving said stop, and a second latch means for a similar purpose, together with actuating means located at different points adjacent the mill, the operation of said stop means by said cam follower requiring the actuation of both latch means.

7. In a rolling mill a pair of work rolls, one at least of which is non-cylindrical in conformation, the said non-cylindrical roll being driven, a guide extending toward the bite of the rolls, a movable stop for a work piece mounted so as to have a portion extending into the path of a work piece in said guide and closely adjacent the bite of said rolls, an adjustable cam mounted to rotate with said non-cylindrical work roll, a cam follower, and means connecting said cam follower with said stop in such a way as to remove said stop from the path of said work piece at a particular desired point in the rotation of said non-cylindrical work roll, a latch means for rendering said cam follower ineffective in moving said stop, a second latch means for a similar purpose, together with actuating means for said latch means located at different points adjacent the mill, the operation of said stop means by said cam follower requiring the actuation of both latch means, and an elevator on the exit side of said mill having a lower position to receive a work piece from the bite of the rolls and an upper position to redeliver a work piece to the entering side of said mill.

EDWIN B. HUDSON.
PAUL H. LONG.
JOSEPH W. PICK.